(12) United States Patent
Van Den Bosch

(10) Patent No.: US 6,175,380 B1
(45) Date of Patent: Jan. 16, 2001

(54) METHOD FOR RANDOMLY ACCESSING STORED IMAGERY AND A FIELD INSPECTION SYSTEM EMPLOYING THE SAME

(75) Inventor: Jeffrey A. Van Den Bosch, Grand Rapids, MI (US)

(73) Assignee: Peninsular Technologies, LLC, Ada, MI (US)

(*) Notice: Under 35 U.S.C. 154(b), the term of this patent shall be extended for 0 days.

This patent is subject to a terminal disclaimer.

(21) Appl. No.: 09/029,285

(22) PCT Filed: Aug. 28, 1996

(86) PCT No.: PCT/US96/13799

§ 371 Date: Feb. 26, 1998

§ 102(e) Date: Feb. 26, 1998

(87) PCT Pub. No.: WO97/08433

PCT Pub. Date: Mar. 6, 1997

(51) Int. Cl.$^7$ .................................................. H04N 7/18
(52) U.S. Cl. ......................................... 348/84; 348/125
(58) Field of Search ............................. 348/61, 82, 84, 348/85, 125; 340/825.06, 825.16; 324/512; 395/2.68; H04N 7/18

(56) References Cited

U.S. PATENT DOCUMENTS

| | | |
|---|---|---|
| Re. 32,574 | 1/1988 | Ceshkovsky et al. ............ 369/32 |
| 4,383,279 | 5/1983 | Kenney, II ...................... 369/93 |
| 4,386,375 | 5/1983 | Altman ............................ 386/45 |
| 4,449,198 | 5/1984 | Kroon et al. .................... 386/83 |
| 4,635,136 | 1/1987 | Ciampa et al. .................. 386/64 |
| 4,963,742 | 10/1990 | Abernathy ..................... 250/338.5 |
| 4,974,168 | 11/1990 | Marx .............................. 364/506 |
| 5,030,911 | 7/1991 | Lam ............................... 324/226 |
| 5,130,966 | 7/1992 | Yoshio et al. .................. 369/49 |
| 5,161,034 | 11/1992 | Klappert ........................ 386/39 |
| 5,870,314 | * 2/1999 | Van Den Bosch ............. 364/507 |

FOREIGN PATENT DOCUMENTS

| | | |
|---|---|---|
| 2050806 | 7/1994 | (CA). |
| 4106807 | 10/1992 | (DE). |
| 8401212 | 3/1984 | (WO). |
| 9516247 | 6/1995 | (WO). |

OTHER PUBLICATIONS

V.I.S. Incorporated News Release, "'IMAGEbase' Software for Pipeline Inspection," Jul. 15, 1993.

* cited by examiner

*Primary Examiner*—Young Lee
(74) *Attorney, Agent, or Firm*—Price, Heneveld, Cooper, DeWitt & Litton (57) ABSTRACT

The present invention relates to a field inspection system (100) for compressing video signals received from a field inspection video camera (14) into compressed video data and for burning the compressed video data on a compact disc (118) along with an electronic logsheet. The electronic logsheet includes a listing of suspected defects or anomalies and associated pointers to reference frames in the compressed video data. The electronic logsheet may be displayed and an operator may access a portion of the field inspection video showing a listed defect by clicking a mouse button (116) when a pointer icon is positioned on the listed defect. To perform this task, the present invention utilizes a technique for randomly accessing the compressed video data in which reference frames included therein are used as access points to the video footage.

41 Claims, 8 Drawing Sheets

Fig. 1

PRIOR ART

Fig. 2

PRIOR ART

METHOD FOR RANDOMLY ACCESSING STORED IMAGERY AND A FIELD INSPECTION SYSTEM EMPLOYING THE SAME

BACKGROUND OF THE INVENTION

The present invention relates generally to a system and method for randomly accessing stored compressed video footage or other continuous image footage and a field inspection system employing the method and system for randomly accessing stored compressed video footage. More specifically, the present invention relates to a field inspection system for acquiring, reviewing, and archiving field inspection video.

Figure 1:
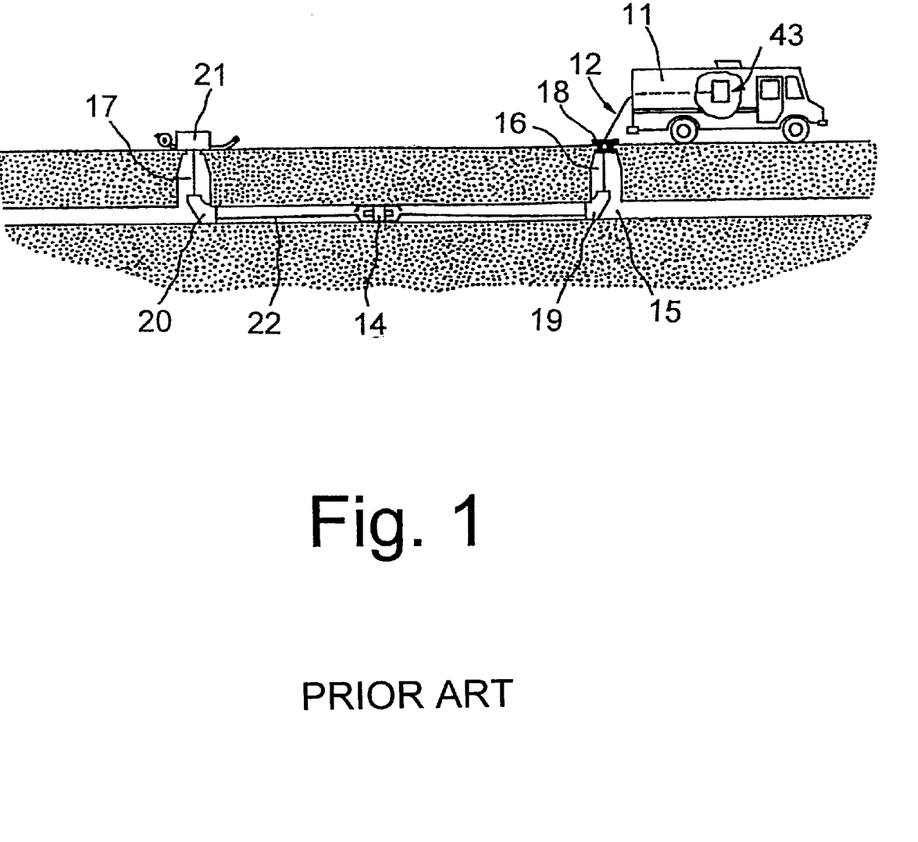
FIG. 1 is a plan view showing the layout and assembly of a field inspection system for inspecting a conduit such as a sewer line.

Most municipalities that are responsible for maintaining sewer systems, require that the periodic inspections of the sewer lines be accomplished by first having a field inspection crew videotape the inside of the sewer lines and then having an engineer review these video tapes to assess the condition and defects in the sewer lines and to recommend whatever actions are necessary to repair such defects. An example of a pipeline data collection and display system that may be used to obtain video footage of the interior of a sewer line is disclosed in U.S. Pat. No. 4,974,168. In this disclosed system, a field inspection crew positions a van 11 (FIG. 1) including the inspection equipment, close to a manhole entry 16 of a sewer line 15 to be inspected. First, the crew backwashes the sewer line, and then sets up the inspection equipment as shown in FIG. 1, by placing a surface roller assembly 18 at the opening of manhole entry 16 and placing a wind-up winch assembly 21 at the opening of an adjacent manhole entry 17. A tow cable 22 extending from wind-up winch assembly 21 is passed through a manhole down roller assembly 20 and connected to a monitoring device 14, which includes a video camera. A cable assembly 12 coupled at one end to electronic survey equipment 43 located in van 11, is passed down through surface roller assembly 18 and a manhole down roller assembly 19 and coupled to an opposite end of monitoring device 14. Having described the physical assembly of a typical field inspection system, the manner by which the video information is obtained, processed, taped, reviewed, and subsequently archived will now be described with reference to FIG. 2.

Figure 2:
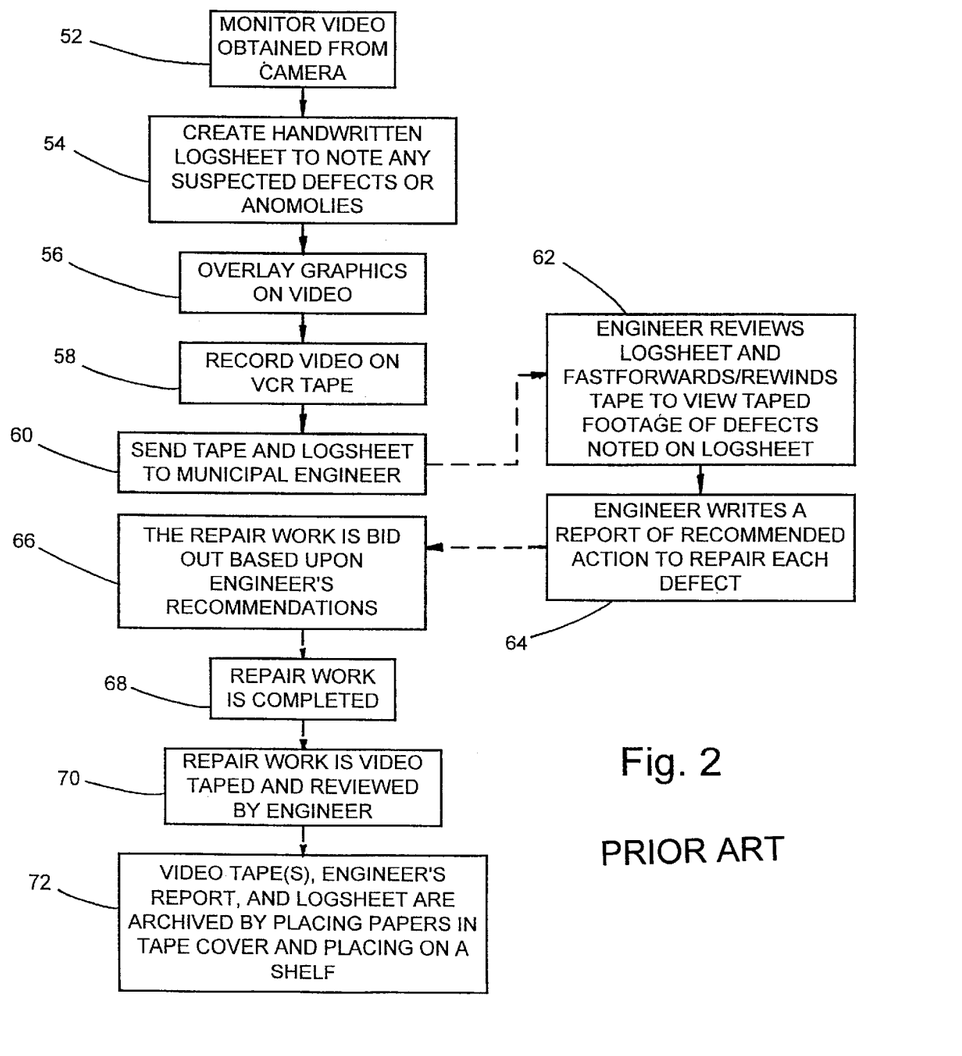
FIG. 2 is a flow diagram illustrating a conventional method for obtaining, viewing, and archiving a field inspection video.

As the field inspection crew moves monitoring device 14 through the sewer line, the video footage obtained from the video camera is fed to a display device and monitored by an operator in van 11 (step 52). While monitoring the video footage, the operator prepares a handwritten logsheet identifying the suspected defects and anomalies and their location in the sewer line (step 54). Some of this information written on the logsheet may be entered on a keyboard such that the system may generate and overlay graphics showing this information on the video footage to which it pertains (step 56). The video footage is recorded on a video tape along with the overlaid graphics using a video cassette recorder (VCR) (step 58). Then after the field inspection crew has filmed the designated portion of sewer line 15, it sends the video tape and the handwritten logsheet to an engineer typically employed by the municipality (step 60).

The engineer's job is to review the field inspection videos supplied by the inspection crew and to recommend what action is to be taken to repair any confirmed defects or anomalies. To perform this task, the engineer will place the video tape in a VCR and review the logsheet to determine whether there are any suspected defects in the sewer line, provided of course that the logsheet is still with its associated video tape. Then the engineer fast-forwards, pauses, and rewinds the video tape to locate the video footage corresponding to each suspected defect indicated on the associated logsheet (step 62). Based upon the review of the video tape, the engineer writes a report identifying each defect and recommending a course of action to repair the defect (step 64). Provided the recommended course of action can be carried out within the municipality's budget, the municipality will accept bids from contractors to repair the sewer line (step 66). Then after a bid is accepted, a contractor will repair the sewer line in accordance with the engineer's recommended course of action (step 68) and the municipality will dispatch the field inspection crew to again video tape the repaired sewer line so that the engineer can review the contractor's work to ensure that the sewer line was repaired properly (step 70). After this process is completed, the logsheet, videotapes, and engineering reports are archived typically by placing the paper documents within the video tape slip cover along with the video tape and placed on a shelf (step 72).

The above described methodology is inefficient for several reasons. First, requiring an engineer to fast-forward and rewind the video tape to find those portions within the video that show the suspected defects listed on the logsheet is frustrating and time consuming for the engineer. Additionally, archiving of the video tapes and logsheets in this manner often results in the logsheets becoming lost or otherwise separated from their associated video tapes.

SUMMARY OF THE INVENTION

Accordingly, the present invention has been made to overcome the above problems. Specifically, one aspect of the present invention is to provide an efficient means for storing, retrieving, and archiving field inspection videos or other continuous imagery. Another aspect of the present invention is to provide an efficient means for storing, accessing, and archiving electronic logsheets with their associated field inspection image footage. An additional aspect of the present invention is to provide a system for randomly accessing compressed image footage corresponding to each entry on an electronic logsheet in order to save an engineer the time required to locate and view the desired image footage on the video tape. Still yet another aspect of the present invention is to provide a system that automatically identifies and assesses each defect found through the use of a field inspection video and automatically produces a report recommending actions to be taken to cure such defects while producing an electronic logsheet for subsequent review by an engineer.

Additional features and advantages of the present invention will be set forth in part in the description which follows and in part will be apparent from the description, or may be learned by practice of the invention. To achieve these and other advantages, and in accordance with the purpose of the invention as embodied and broadly described herein, the pipeline inspection system comprises receiving means for receiving an image signal representing video or other continuous image footage of the pipeline under inspection, compressing means for compressing the received image signal to provide compressed image data having a plurality of sequential frames including reference frames appearing at predefined intervals, and means for creating an electronic logsheet including a table listing suspected defects and/or anomalies in the pipeline recorded in the video footage and, for each suspected defect and anomaly, a pointer identifying a reference frame of the compressed image data closest to a beginning point of the video footage showing the associated suspected defect or anomaly. The pipeline inspection system may further include means for storing the compressed image data, the logsheet data, and images of the original order of the following documents that include corroborating field-acquired data: the handwritten logsheet; the inventory; the manhole and pipeline inspection sheets; the assessment maps; as-built drawings; odor and corrosion data; and the data from the Legacy Sewer Information Management System. The pipeline inspection system may include means for burning the compressed video and/or other imagery, the logsheet data, and the corroborating data in a compact disc. The system may also include display means for displaying the table, input means for permitting a user to select a suspected defect or anomaly listed on the table, decompressing means for decompressing frames of the compressed image data and for initially decompressing a reference frame corresponding to the reference frame identified by the pointer associated with the selected suspected defect or anomaly, and playback control means for controlling the playback of the image footage by selecting frames within the compressed image data for the decompressing means to decompress, and for providing the decompressed frames to the display means for display of the video footage to the user. Additionally, the system may include defect identification means, such as a neural network, for receiving the image signals, analyzing the video footage and other field acquired data, and for detecting and identifying defects in the pipeline under inspection. Further still, the system may include means for recommending a course of action for repairing each identified defect and means for generating a report including a listing of each defect, the location of each defect, the recommended course of action for repairing each identified defect, and a still frame image of each identified defect.

BRIEF DESCRIPTION OF THE DRAWINGS

The accompanying drawings, which are incorporated in, and constitute a part of, this specification illustrate several embodiments of the invention and together with the description, serve to explain the objects, advantages, and principles of the invention. In the drawings.

DETAILED DESCRIPTION OF THE PREFERRED EMBODIMENTS

Figure 3:
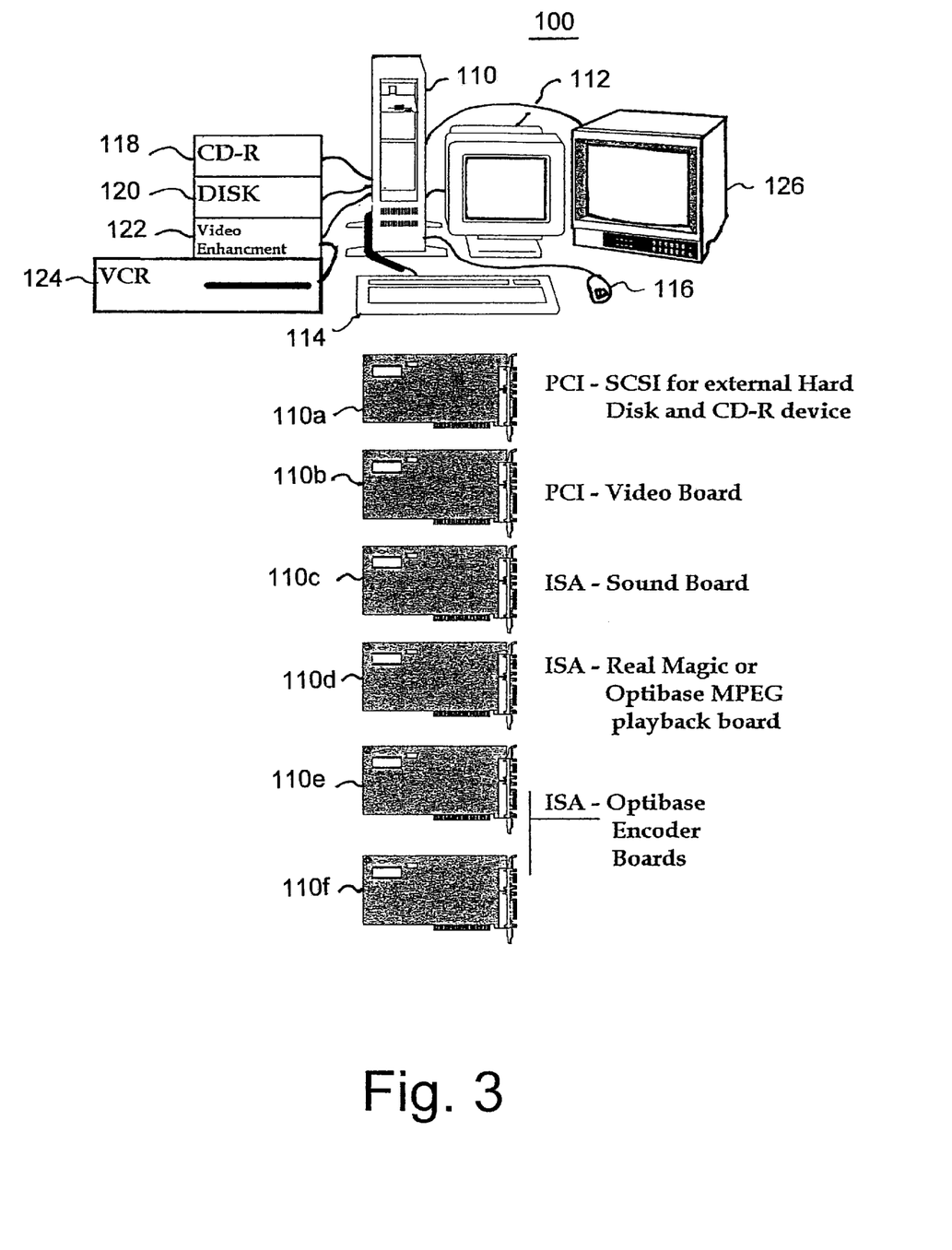
FIG. 3 is a plan view of hardware system for carrying out the methodology and functions of the first embodiment of the present invention.

FIG. 3 shows the hardware implementation of a system 100 constructed in accordance with the first embodiment of the present invention. System 100 includes a personal computer (PC) 110, which preferably includes a Pentium 100 MHz microprocessor, a PCI-SCSI board 110a for connecting an external hard disk drive and an external CD-R device, a PCI-video board 110b, ISA sound board 110c, an ISA-Real Magic or Optibase MPEG Playback board 110d, and ISA Optibase MPEG real-time video encoder boards 110e and 110f. The system further includes a computer monitor 112, a keyboard 114, a mouse or trackball 116, a CD-R device 118, a hard disk drive 120, a real-time video enhancement unit 122, an industrial grade VCR 124, and a television monitor 126 all coupled to PC 110. Hard disk drive 120 may be an internal or external hard disk drive having at least 650 MB, and preferably 2GB, of available memory space. Real-time video enhancement unit 122, is preferably a DigiVision-V-Lace CE-3000. Although specific components are described above, other brands or types of similar hardware components may be used. Having described the hardware used to implement the first embodiment of the present invention, the methodology according to the first embodiment 150 will now be described with reference to FIG. 4.

Figure 4:
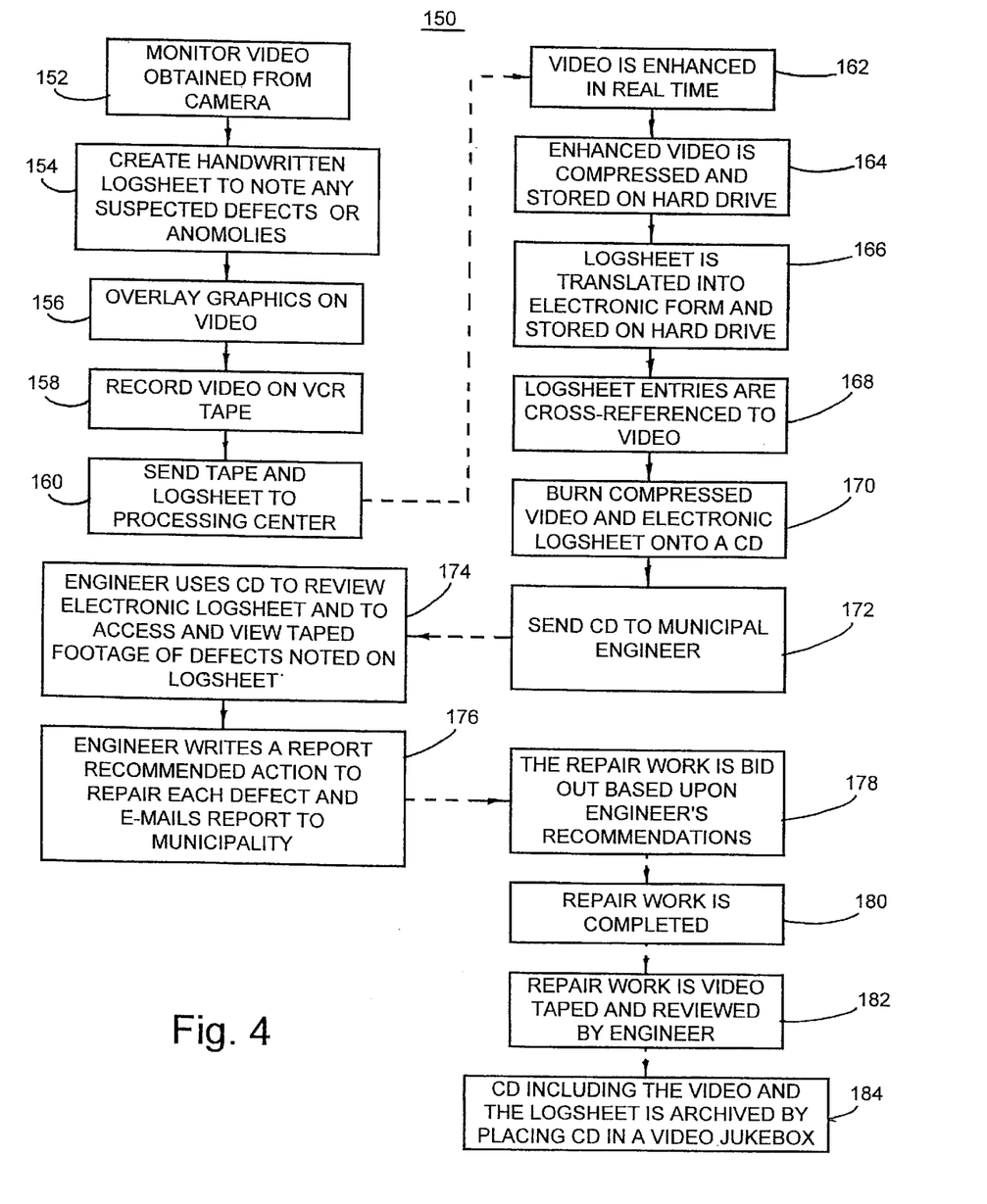
FIG. 4 is a flow diagram illustrating a method of acquiring, reviewing, and archiving a field inspection video in accordance with the first embodiment of the present invention.

The initial acquisition of the field inspection video and creation of a handwritten logsheet are carried out in the manner as previously described with respect to FIG. 2. Specifically, a field inspection crew and van are dispatched to the site of a sewer line to be inspected and the crew backwashes the pipeline between the manholes at either end of the sewer line. The field inspection video acquisition system is then set up as shown in FIG. 1. As the video camera is pulled through the sewer line, an operator monitors the video obtained from the video camera (step 152). At the same time, the operator creates a handwritten logsheet noting any suspected defects or anomalies with respect to the sewer pipes (step 154). Further, some of the information contained in the logsheet may be generated as graphics are overlaid on the video (step 156). The video is recorded on a VCR tape including any of the overlaid graphics (step 158). Then, instead of submitting the video and logsheet to an engineer for review, the field inspection crew delivers the tape and handwritten log sheet to a processing center (step 160) that produces a compact disc (CD) including the video footage of the field inspection and an electronic logsheet.

At the processing center, the video tape is placed in VCR 124 and played through video enhancer 122 to enhance the video in real time (step 162). The enhanced video is then compressed and stored on hard disk drive 120 (step 164) using a video compression algorithm such as the compression algorithms standardized by the Moving Picture Experts Group (MPEG) and known as MPEG-1, MPEG-2, MPEG-3, and MPEG-4 compression algorithms. Although the present invention is described hereinafter with respect to the MPEG video compression algorithms, it will be appreciated by those skilled in the art that other video compression algorithms could similarly be used. Before describing the rest of process 150 shown in FIG. 4, a brief description of the MPEG compression algorithms follows.

MPEG-1 and MPEG-2 use an inter frame method of compression. In most video scenes, the background remains relatively stable while action takes place in the foreground. The background may move, but a great deal of the scene is redundant. MPEG starts its compression by creating a reference frame called an Intra-frame. These Intra-frames contain the entire frame of video and are placed every 10 to 15 frames in the sequence of frames defining the video. Since only a small portion of the frames which fall between the reference frames is different from the rest of the reference frames, only the differences are captured, compressed, and stored.

The MPEG-1 standard defines a bit stream for compressed video and audio which is frequently optimized for CD data rates. MPEG can be encoded at various bit rates. At higher bit rates MPEG-1 can approach broadcast video quality but utilizes a large amount of storage space. For example, a file encoded at 150 Bps (1.2 Mbit/s) will require 9 MBs of storage for every one minute of video, while a file encoded at 300 Bps (2.4 Mbit/s) will require twice as much storage.

MPEG utilizes three layers known as the system layer, the video layer, and the audio layer. There are three types of pictures in the MPEG video layer (ISO/IEC 11172-2). One type is the Intra-frame previously discussed, which is coded using information from within the picture. Another type is the P-frame (predictive-coded picture), which is coded using motion compensated prediction from a past Intra- or P-frame. The third type is a B-frame (Bi-directionally predictive-coded picture), which is coded using motion compensated prediction from past and future Intra- or P-frames.

The basic unit of coding within a picture is called a macroblock. Macroblocks are encoded in sequence, left to right, top to bottom. Each macroblock contains six 8×8blocks: 4 blocks of luminance and 2 blocks of chrominance. The basic scheme involves predicting motion from frame to frame, then organizing redundancies within each frame utilizing discrete cosine transforms (DCTs). The DCTs are performed on 8×8 blocks and the motion prediction is preformed in the luminance channel on 16×16 blocks. The DCT coefficients are quantized to eliminate bits off the bottom and then Huffinan coded. The final task for the encoder is to decode the Intra- and P-frames so that they can be used as references for subsequent encoding.

The MPEG audio layer (ISO/IEC 11172-3), has four different modes possible, single channel, dual channel (two independent audio channels coded within one bit stream), stereo (left and right signals of a stereo pair coded within one bit stream), and joint, which exploits the stereo irrelevancies and redundancies. Different layers of the coding can also be used and are dependent on the application. Layer-I covers mapping audio input into 32 sub bands within a minimum of about 19 ms. Layer-II covers additional coding of bit allocation, scale factors, and samples within a minimum delay of about 35 ms. Layer-III covers increased frequency resolution based on a hybrid filterbank within a minimum delay of about 59 ms. Currently, most MPEG encoders use Layer-II.

MPEG audio is intended for sampling rates of 32 kHz, 44.1 kHz, and 48 kHz and can achieve a compression ratio of approximately 8:1 with no noticeable loss in quality. MPEG audio is not truly CD-quality audio, but the difference between MPEG encoded audio and CD audio is usually detectable only by computerized equipment.

The MPEG system layer (ISO/IEC 11172-1) defines how encoded video and audio files are combined into a single file. Most encoders can multiplex one video and one video file on-the-fly (during the encoding procedure) or off-line. Off-line multiplexing is useful when a person wants to combine multiple audio files with one or more video files for use in multilingual applications. A multiplexed stream contains one or more elementary streams interleaved together to form a single encoded video/audio bit stream. Synchronization is maintained within a multiplexed stream by utilizing presentation time stamps to allow playback of all streams from a master timebase. Presentation time stamps are recorded while encoding.

The system of the present invention preferably utilizes an ISA Real Magic or Optibase MPEG playback board 110*d* to decode the compressed video data. The function of such a decoding system is to reassemble pictures from compressed video data to display them in a synchronized sequence at the correct presentation times. A display of a picture occurs instantaneously at its presentation time. The output of an audio unit, such as ISA sound board 110*c* starts at its presentation time when the decoder presents the first sample. Further samples in the unit are presented in sequence at the audio sampling rate.

Referring back to FIG. 4, after the video is compressed and stored on hard disk drive 120, a data input operator translates the handwritten logsheet into electronic form and stores the electronic form on hard disk drive 120 (step 166). The electronic logsheet resembles a spreadsheet in many respects in that it would typically include a plurality of rows each corresponding to a suspected defect or anomaly, and plurality of columns corresponding at least to the actual location within the sewer line and the location on the video tape of the associated video footage showing this particular suspected defect or anomaly. Next, an additional column is created within this table associating each suspected defect or anomaly with the closest reference frame (Intra-frame) within the compressed video data corresponding to the video footage beginning just prior to that which shows the suspected defect or anomaly (step 168). Then the compressed video data and the electronic logsheet are burned into a CD (step 170). As will be explained in greater detail below by providing the compressed video data and electronic logsheet including the column with pointers to specific reference frames within the compressed video data on a CD, a person may randomly access specific portions of the video footage corresponding to the logsheet entry identifying a defect or anomaly.

Additionally, images of all other documentation containing corroborating field acquired data may be burned on the CD. Such documentation may include the handwritten logsheet; the inventory; the manhole and pipeline inspection sheets; the assessment maps; as-built drawings; odor and corrosion data; and the data from the Legacy Sewer Information Management System.

Further, although the present invention has been described above with respect to video footage taken using a video camera, other forms of continuous imaging may be obtained, compressed, and stored in addition to, or as an alternative to, the video footage. For example, such continuous image footage may include imagery obtained by laser scanning or by sonic or holographic imaging. These forms of image footage may be compressed using MPEG or similar techniques and burned into a disk with or in lieu of the video footage. Further, this continuous image footage may be randomly accessed in the same manner as described below.

After the CD has been burned, the processing center sends the CD to an engineer employed by the municipality (step 172) so that the engineer may review the suspected defects or anomalies in the video, review images of all corroborating documentation, and make any necessary repair recommendations. To accomplish this task, the engineer places the CD in a CD drive and causes the system to read the electronic logsheet stored on the CD and to display the logsheet on computer monitor 112. The engineer may then use mouse 116 to click on any given entry in the logsheet identifying a suspected defect or anomaly and thereby cause the system to access that portion of the field inspection video and display the video image on either computer monitor 112 or television screen 126 (step 124). Again, as described above, this is accomplished by identifying the closest reference frame corresponding to a point in the video footage that is just prior to the noted defect or anomaly identified on the logsheet. Initially the image shown upon selecting a given defect is a still frame image of a location in the sewer pipe a predetermined number of feet just prior to the defect. The engineer may then manipulate the video footage in the same manner as if it were on VCR by using mouse 116 to click on a "play" icon, a "fast forward" icon, a "rewind" icon, or a "pause" icon. Thus, although clicking on an identified defect within the logsheet will bring the engineer to a specific frame within the field inspection video, the engineer may rewind back from this specific frame or go forward from this frame to any other location within the field inspection video.

The system may also display a window in which the engineer may make comments or recommendations with respect to the defect being shown. These comments and recommendations may be accumulated into a report which may be collectively or separately supplied to the municipality by e-mail or facsimile simply by clicking on an icon at any point during the engineer's review (step 176). As clear from the foregoing, the system of the present invention clearly shortens the amount of time an engineer would typically spend reviewing a VCR tape and separate handwritten logsheets, and subsequently producing a report corresponding to the reviewed defects. The advantages obtained by compressing the field inspection video and burning the video onto a CD with the electronic logsheet is obtained by providing a means by which specific frames may be randomly accessed within compressed video or other image data. Prior to the present invention, no such means existed. And although video compressed using a compression algorithm such as MPEG has included reference frames such as Intra-frames, such reference frames had not previously been contemplated as being useful as providing a reference point for random access within the compressed video data.

After the municipality receives the engineer's report, which may include a priority ranking for each noted defect and still-frame images taken from the video footage of the defects identified in the report the municipality will begin accepting bids from contractors to repair the defects based on the engineer's recommendations (step 178). Once the repair work is completed (step 180), a field inspection crew is dispatched to video tape the repair work which is subsequently reviewed by the engineer (step 182).

After the municipal engineer has finished reviewing the video footage on a CD, the sections or runs of pipeline that are videoed on each CD are cross-referenced on a database that shows the CD physical exterior number. The CD can then be archived on a shelf in an off-line environment or they may be put in a CD jukebox such as the Pioneer 500 CD device. Seven of these CD jukeboxes can be daisy-chained to each SCSI board in the PC making available 3,500 CDs per SCSI with the possibility of more than 10,000 CDs in a near-line environment with as many hours of randomly accessible video (step 184).

As a modification to the above described embodiment, it is possible in, step 168 to utilize software that performs OCR/ICR (optical or intelligent character recognition) of the graphic information on the video tape to automatically cross-reference each logsheet entry to its corresponding beginning point on the compressed video data. Software such as X-caliber (Xiris-Identech, Sharp Frame-grabber) is available for performing this OCR/ICR function. Thus, this modification would eliminate the need to have an operator manually cross-reference the logsheet to the beginning points on the compressed video data. It should be further noted that, in step 154, the logsheet could be created by the field inspection crew in electronic form rather than handwritten form and provided on a diskette. In this case it would not be necessary in step 166 to key-in the logsheet as long as the electronic logsheet provided by the field inspection crew is in the proper format.

Figure 5:
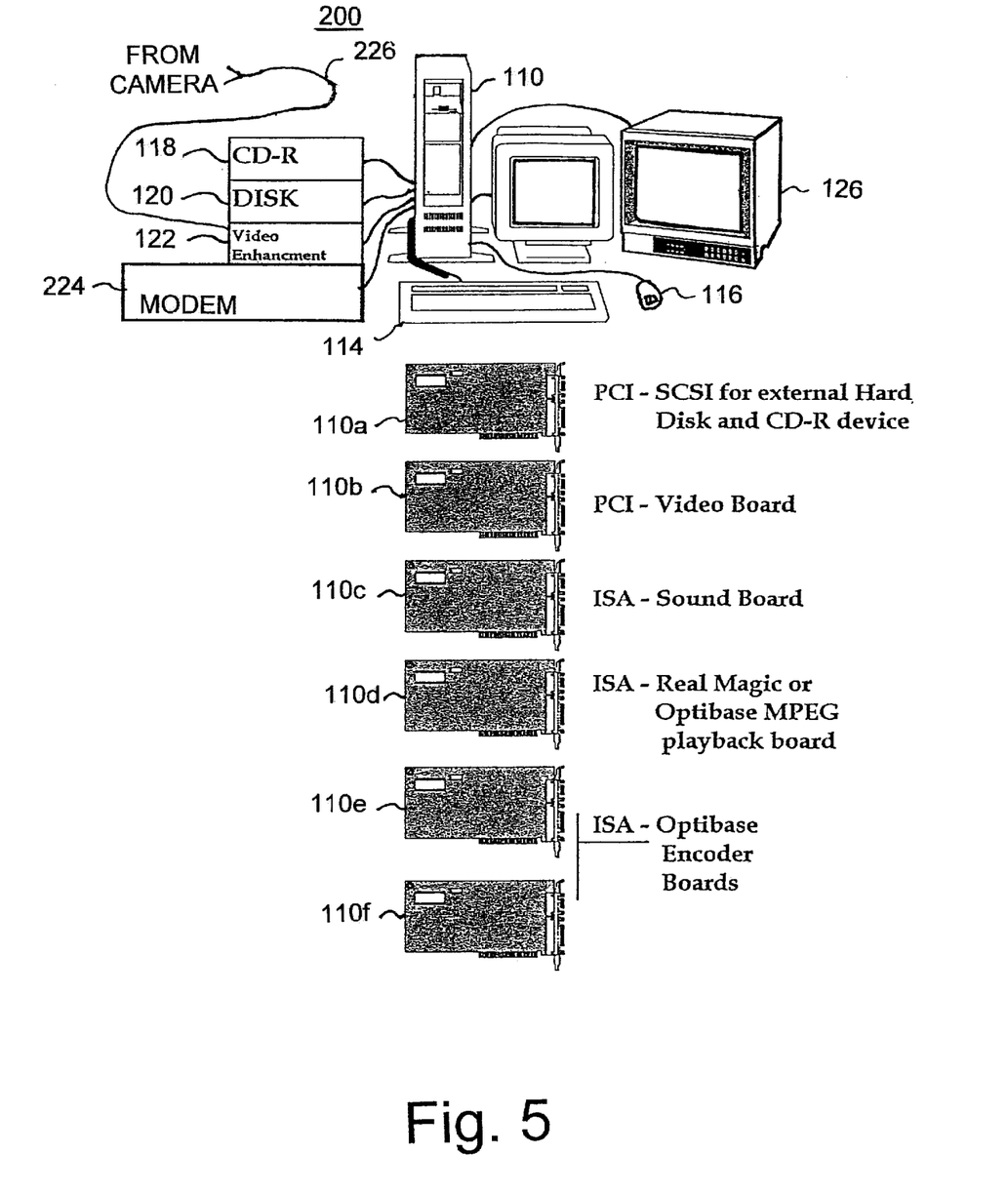
FIG. 5 is a plan view of a hardware system for carrying out the methodology and functions of the second embodiment of the present invention.

FIG. 5 shows the hardware implementation for a system 200 that performs the methods and functions of the second embodiment of the present invention. System 200 differs from system 100 shown in FIG. 3 in that industrial VCR 124 may be replaced with an external or internal modem 224, and a line 326 connects a video feed from the video camera directly to the system via video enhancement unit 122 such that the field inspection video may be recorded digitally on hard disk 120.

Figure 6:
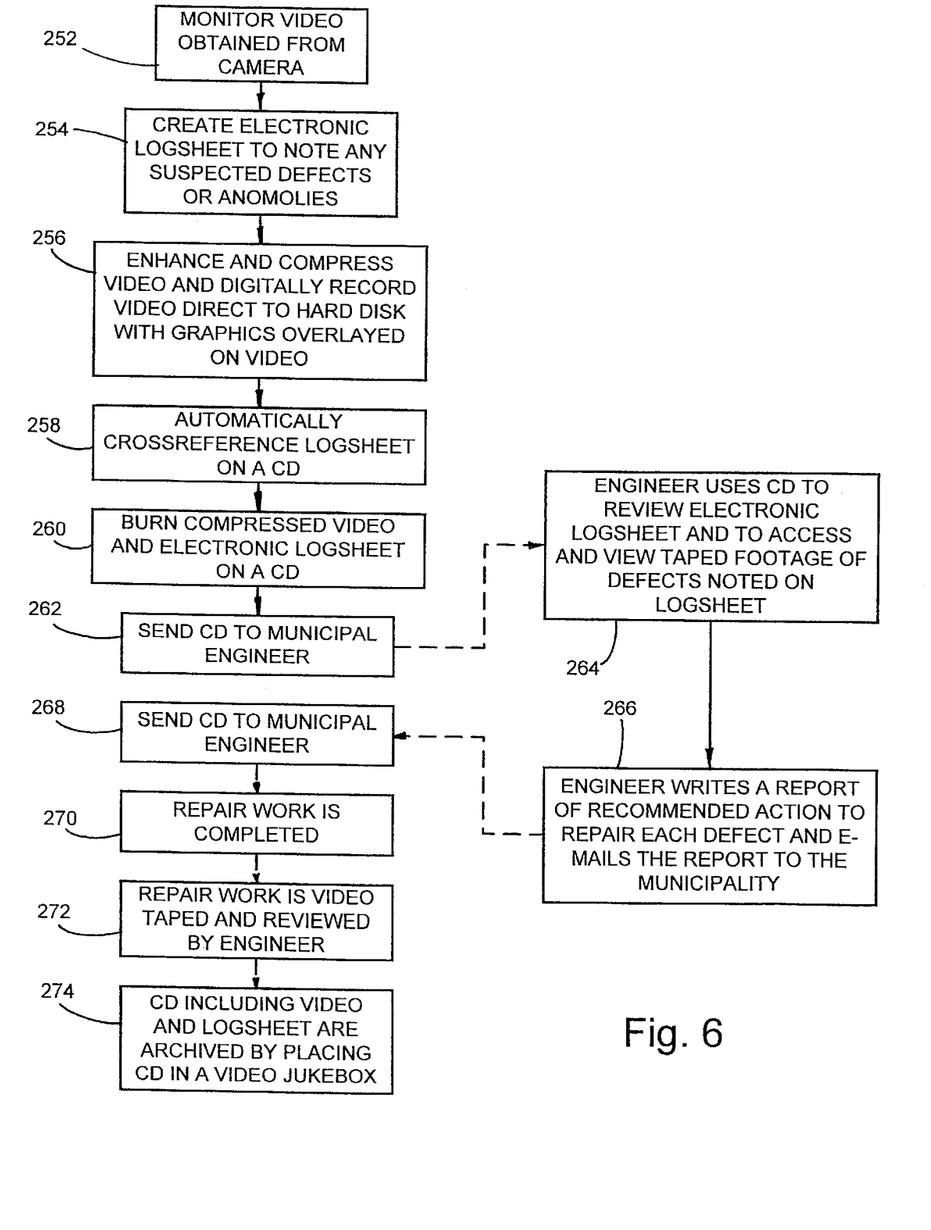
FIG. 6 is a flow diagram illustrating a method of acquiring, reviewing, and archiving a field inspection video in accordance with the second embodiment of the present invention.

FIG. 6 shows the flow of events in accordance with the second embodiment 250 of the present invention. The second embodiment differs from the first embodiment in that the functions preformed by the processing center are instead performed automatically by implementing hardware system 200 in the van of the field inspection crew. Specifically, an operator again monitors the video obtained from the video camera (step 252) while creating an electronic logsheet in the proper format to note any suspected defects or anomalies (step 254). Then, the system enhances and compresses the video and digitally records the video direct to hard disk drive 120 with any generated graphics overlaid on the video (step 256). By digitally recording the video direct to hard disk, the industrial VCR 124 of system 100 may be eliminated from the hardware configuration of system 200. With the compressed video data and electronic logsheets stored on the hard disk drive 120, the logsheet entries may be automatically cross-referenced to the beginning points in the compressed video data in the manner discussed above (step 258). Next, the compressed video data, electronic logsheet, and images of documents containing field acquired corroborating data are burned on a CD (step 260), which is then sent to the municipal engineer (step 262).

The remaining portion of the second embodiment is identical to that in the first embodiment in that the engineer utilizes the CD obtained from the field inspection crew to review the electronic logsheet and to access and view taped footage of the suspected defects and anomalies noted on the logsheet (step 264). After viewing the taped footage and corroborating data, the engineer writes a report of recommended action to repair each defect and e-mails or faxes the report to the municipality (step 266). The municipality then bids out the repair work based upon the engineer's recommendations (step 268) and a contractor completes the repair work (step 270). The process may then be repeated to video tape the repair work to ensure that it was preformed correctly (step 272). After the CD is used by the engineer, it may be cataloged and stored in a CD jukebox for near-line referencing (step 274). As can be seen from the foregoing, the second embodiment advantageously eliminates the need for the processing center and speeds up the production of a CD that the municipal engineer subsequently reviews.

Figure 7:
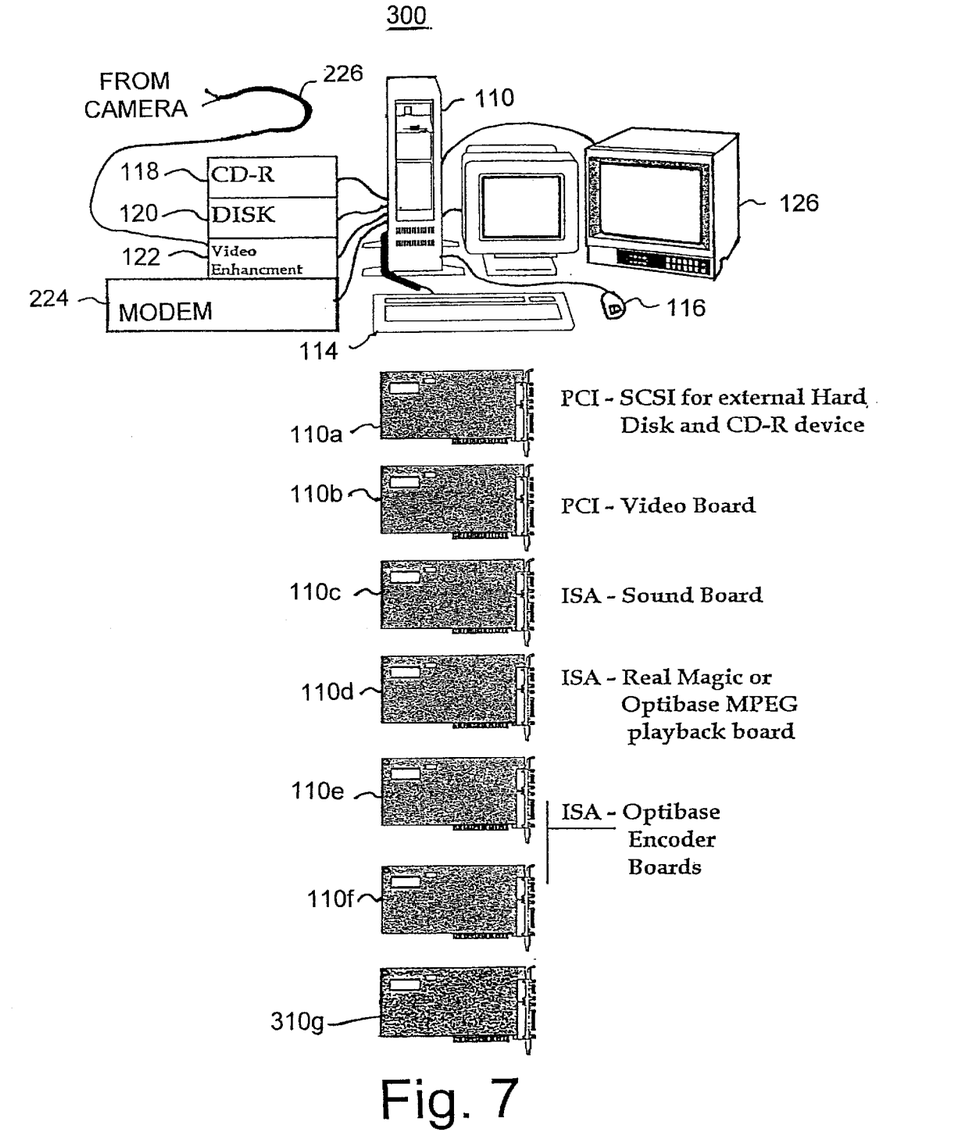
FIG. 7 is a plan view illustrating the hardware for carrying out the methodology and functions of the third embodiment of the present invention.

FIG. 7 shows the hardware implementation for a system 300 that performs the methods and functions of the second embodiment of the present invention. System 300 differs from system 200 shown in FIG. 5 in that system 300 would include either additional software or firmware, such as board 310g to implement a Machine Vision System into system 300.

Figure 8:
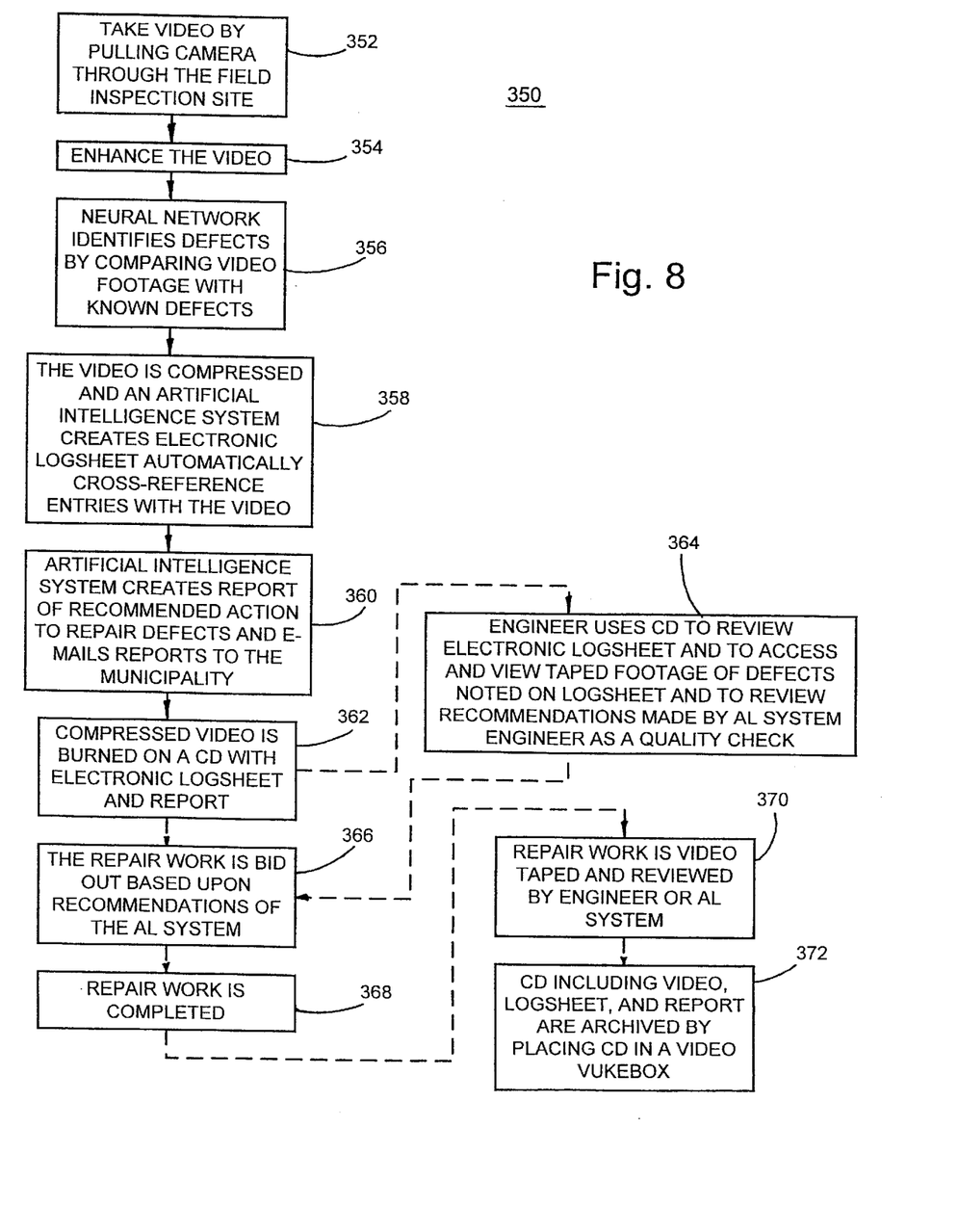
FIG. 8 is a flow diagram illustrating a method of acquiring, reviewing, and archiving a field inspection video in accordance with the third embodiment of the present invention.

FIG. 8 shows the sequence of events in accordance with a method 350 of the third embodiment of the present invention. The third embodiment differs from the second embodiment by eliminating additional human intervention steps in the process. Specifically, the third embodiment utilizes a neural network to identify defects and an artificial intelligence system to create an electronic logsheet and a report of recommended action for repairing the defects identified by the neural network. Thus, the steps performed by the municipal engineer and the operator of the field inspection crew may be eliminated. Process 350 begins with a field inspection crew taking a video by pulling the video camera through the field inspection site (step 352). The video signal provided from the video camera is enhanced by video enhancement unit 122 (step 354) prior to being fed to PC 110. Next, a Machine Vision System including a neural network and an artificial intelligence system, which may be implemented as software in PC 110, detects and identifies defects in the sewer pipe by comparing the enhanced video footage with learned defects (step 356). Hence, the field inspection video is compressed and stored on hard disk drive 120 and the artificial intelligence system generates graphics, which are overlaid on the video footage, and creates an electronic logsheet while automatically crossreferencing entries with the compressed video data in the manner discussed above (step 358). The artificial intelligence system may then create a report of the recommended actions to repair the defects based on the identification of the defects and the corroborating data and e-mails the report to the municipality (step 360) via the Internet or other network system. Thus, the municipality may receive a report on the defects as the inspection is in progress and need not wait until an engineer reviews the video footage and writes a report. Alternatively, system 300 may be located at a central location of the municipality and the video signal from the video camera may be communicated to the system by phone lines, radio frequency signals, satellite, the Internet, or the like.

Simultaneously with or soon after the system creates the report in step 360, the compressed video is burned on a CD with the electronic logsheet, report, and images of documents containing corroborating field acquired data (step 362). Then, the CD may be reviewed by an engineer as a quality check on the system (step 364). Once the municipalities gain confidence in the system's performance, the costly quality review step 364 may eventually be eliminated. Subsequently, the repair work is bid out based upon the recommendations provided by the Machine Vision System in it's report (step 366), the repair work is completed (step 368) and revideoed to ensure that the repair work was completed to specification (step 370). Then the CD may be stored or archived near-line in a video jukebox (step 372).

In all three of the above described embodiments, the monitoring device 14 may be equipped with GPS and GIS system for automatically identifying the location of the camera within the pipeline. In this manner, a mapping of the municipality may be generated by the system showing the precise location of each defect in a pipeline.

Although the inspection system of the present invention has been described with respect to a pipeline inspection system, the present invention is not limited thereto, and the principles of the present invention may be used in many other types of applications. For example, the inspection system of the present invention may be employed in any application in which it is desirable to randomly access various points of interest within a videotaped procedure. Such application may include medical procedures, tests, and autopsies, fire inspections, and other safety inspections. Numerous other applications of the present invention will become apparent to those skilled in the art after reviewing the description of the present invention. Further, although the use of a recordable CD-ROM disk has been described, other computer-readable media, such as DVD could be used.

The above described embodiment was chosen for purposes of describing but one application of the invention. It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A field inspection system comprising:

receiving means for receiving image signals representing continuous image footage of the field item under inspection;

compressing means for compressing the received image signals to provide compressed image data having a plurality of sequential frames including reference frames; and means for creating an electronic logsheet including a table listing points of interest recorded in the image footage and, for each point of interest, a pointer identifying a reference frame of said compressed image data closest to a beginning point of the image footage showing the associated point of interest such that said electronic logsheet may subsequently be displayed to allow the user to select one of the listed points of interest using an input device and to thereby access and view the continuous image footage showing the selected point of interest.

2. The field inspection system as defined in claim 1, and further including means for storing said compressed image data and said logsheet.

3. The field inspection system as defined in claim 1, and further including means for burning said compressed image data and said logsheet in a compact disk.

4. The field inspection system as defined in claim 1, and further including:

display means for displaying said table;

input means for permitting a user to select a point of interest listed on said table;

decompressing means for decompressing frames of said compressed image data and for initially decompressing a reference frame corresponding to the reference frame identified by the pointer associated with the selected point of interest; and playback control means for controlling the playback of the image footage by selecting frames within said compressed image data for said decompressing means to decompress, and for providing the decompressed frames to said display means for display of the video footage to the user.

5. The field inspection system as defined in claim 1 and further including means for generating and overlaying graphic characters on the image signals representing locations of each point of interest listed on the electronic logsheet.

6. The field inspection system as defined in claim 5 and further including means for automatically creating said pointers by reading location data from said electronic logsheet for each listed point of interest, identifying said graphic characters overlaid on the image signals that correspond to the location data for each listed point of interest, identifying the closest reference frame to a point in the image footage where the corresponding overlaid graphics first appear, and creating an entry in said electronic logsheet for each listed point of interest representing the identified reference frame.

7. The field inspection system as defined in claim 1, wherein said compressing means compresses the received image signal as it is incoming and outputs the compressed image data as a computer-readable digital data signal that may be stored in a computer-readable medium.

8. The field inspection system as defined in claim 1, wherein said compressing means compresses the received image signal as it is incoming and outputs the compressed image data as a computer-readable digital data signal that may be stored on a computer hard disk drive.

9. A pipeline inspection system for inspecting pipelines, comprising:

receiving means for receiving an image signal representing continuous image footage of the pipeline under inspection;

compressing means for compressing the received image signal to provide compressed image data having a plurality of sequential frames including reference frames; and means for creating an electronic logsheet including a table listing suspected defects and/or anomalies in the pipeline recorded in the image footage and, for each suspected defect and anomaly, a pointer identifying a reference frame of said compressed image data closest to a beginning point of the image footage showing the associated suspected defect or anomaly such that said electronic logsheet may subsequently be displayed to allow a user to select one of the listed suspected defects and/or anomalies using an input device and to thereby access and view the continuous image footage showing the selected suspected defect or anomaly.

10. The pipeline inspection system as defined in claim 9, and further including means for storing said compressed image data and said logsheet.

11. The pipeline inspection system as defined in claim 9, and further including means for burning said compressed image data and said logsheet in a compact disk.

12. The pipeline inspection system as defined in claim 9, and further including:

display means for displaying said table;

input means for permitting a user to select a suspected defect or anomaly listed on said table;

decompressing means for decompressing frames of said compressed image data and for initially decompressing a reference frame corresponding to the reference frame identified by the pointer associated with the selected suspected defect or anomaly; and playback control means for controlling the playback of the image footage by selecting frames within said compressed image data for said decompressing means to decompress, and for providing the decompressed frames to said display means for display of the image footage to the user.

13. The pipeline inspection system as defined in claim 9 and further including means for generating and overlaying graphic characters on the image signals representing locations of each suspected defect or anomaly listed on the electronic logsheet.

14. The pipeline inspection system as defined in claim 13 and further including means for automatically creating said pointers by reading location data from said electronic logsheet for each listed defect or anomaly, identifying said graphic characters overlaid on the image signals that correspond to the location data for each listed defect or anomaly, identifying the closest reference frame to a point in the image footage where the corresponding overlaid graphics first appear, and creating an entry in said electronic logsheet for each listed defect or anomaly representing the identified referenced frame.

15. The pipeline inspection system as defined in claim 9 and further including defect identification means for receiving the image signals, analyzing the image footage, and for detecting and identifying defects in the pipeline under inspection.

16. The pipeline inspection system as defined in claim 15 and further including means for recommending a course of action for repairing each identified defect.

17. The pipeline inspection system as defined in claim 16 and further including means for generating a report including a listing of each defect, the location of each defect, the recommended course of action for repairing each identified defect, and a still frame image of each identified defect.

18. The pipeline inspection system as defined in claim 9, wherein said compressing means compresses the received video signal as it is incoming and outputs the compressed video data as a computer-readable digital data signal that may be stored in a computer-readable medium.

19. A pipeline inspection system for inspecting pipelines, comprising:

receiving means for receiving an image signal representing continuous image footage of the pipeline under inspection;

compressing means for compressing the received image signal to provide compressed image data having a plurality of sequential frames including reference frames;

means for creating an electronic logsheet including a table listing suspected defects and/or anomalies in the pipeline recorded in the image footage and, for each suspected defect and anomaly, a pointer identifying a reference frame of said compressed image data closest to a beginning point of the image footage showing the associated suspected defect or anomaly; and defect identification means for receiving the image signals, analyzing the image footage, and for detecting and identifying defects in the pipeline under inspection, wherein said defect identification means includes a neural network.

20. The pipeline inspection system as defined in claim 19, wherein said compressing means compresses the received image signal as it is incoming and outputs the compressed image data as a computer-readable digital data signal that may be stored in a computer-readable medium.

21. The pipeline inspection system as defined in claim 19, wherein said defect identification means includes at least one computer hardware board for high frame rate machine vision combined with neural networking software.

22. A data structure stored on a computer-readable medium comprising:

compressed image data having a plurality of frames including a plurality of reference frames, said compressed image data representing continuous image footage in compressed form; and a table associating an identifier for each portion of the continuous image footage to be accessed with a pointer corresponding to the closest reference frame to the first frame of the portion of the continuous image footage to be accessed such that said table may subsequently be displayed to allow a user to select one of the identifiers stored in said table using an input device and to thereby access and view the portion of the continuous image footage corresponding to the selected identifier.

23. The data structure as defined in claim 21, wherein said continuous image footage is continuous image footage of a pipeline inspection, said table is a logsheet listing suspected defects in the inspected pipeline, and said identifiers identify the suspected defects.

24. An inspection system comprising:

an imaging device for producing image signals representing continuous image footage of an item under inspection;

defect identification means for receiving the image signals, analyzing the continuous image footage, and for detecting and identifying defects in the item under inspection;

a memory for storing the image signals as image data; and means for creating and storing in said memory, an electronic logsheet listing the identified defects and a location in the stored image data for each identified defect, corresponding to a portion of the continuous image footage that shows the associated defect.

25. The inspection system as defined in claim 24, wherein said defect identification means includes a neural network.

26. The inspection system as defined in claim 25, wherein said defect identification means includes at least one computer hardware board for high frame rate machine vision combined with neural networking software.

27. The inspection system as defined in claim 24 and further including means for recommending a course of action for repairing each identified defect.

28. The inspection system as defined in claim 27 and further including means for generating a report including a listing of each defect, the location of each defect, the recommended course of action for repairing each identified defect, and a still frame image of each identified defect.

29. A computer-implemented method of randomly accessing continuous image footage stored in compressed form on a computer-readable medium, the compressed image footage having a plurality of frames including a plurality of reference frames, the method comprising the steps of:

creating a table associating an identifier for each portion of the image footage to be accessed with a pointer corresponding to the closest reference frame to the first frame of the portion of the image footage to be accessed;

inputting an identifier for a selected portion of the image footage to be accessed;

accessing said table to identify the closest reference frame to the first frame of the selected portion of the image footage to be accessed;

decompressing the compressed image footage starting with the identified reference frame; and displaying the selected portion of the decompressed image footage.

30. A method of accessing stored field inspection data and compressed image data representing a field inspection continuous image, the method comprising the steps of:

reading and displaying the field inspection data in tabular form listing points of interest in the field inspection imagery;

cross-referencing each of the listed points of interest with one of a plurality of reference frames within the compressed image data corresponding to a beginning point of a portion of the field inspection imagery that shows the associated point of interest;

storing a pointer to the cross-referenced frame in association with each point of interest;

selecting a point of interest listed in the displayed field inspection data;

decompressing a reference frame identified by a pointer associated with the selected point of interest; and displaying the decompressed reference frame on a display monitor.

31. A computer-implemented method of randomly accessing a selected portion of continuous video footage stored in compressed form on a computer-readable medium, the compressed video footage having a plurality of frames including a plurality of reference frames, the method comprising the steps of:

creating a data reference for each portion of the video footage to be randomly accessed;

displaying each data reference on a display device to allow a user to select a portion of the video footage to be accessed by selecting a corresponding displayed data reference;

decompressing the compressed video footage starting with a reference frame that precedes the selected portion of the video footage; and displaying the selected portion of the decompressed video footage.

32. The method of claim 31, wherein each displayed data reference points to a reference frame of said compressed video footage closest to a beginning point of the selected portion of the video footage.

33. The method of claim 31, wherein each data reference corresponds to a point of interest in the video footage.

34. The method of claim 31, wherein each data reference is displayed in a table, list, or grid that is displayed on the display device.

35. The method of claim 31, wherein said continuous video footage is compressed in MPEG format and said reference frames are I-frames.

36. A method of accessing stored field inspection data and compressed video data representing a field inspection video, the method comprising the steps of:

reading and displaying the field inspection data that identifies points of interest in the field inspection video;

cross-referencing each of the listed points of interest with one of a plurality of reference frames within the compressed video data corresponding to a beginning point of a portion of the field inspection video that shows an associated point of interest;

selecting a point of interest listed in the displayed field inspection data;

decompressing a reference frame identified by the selected point of interest; and displaying the decompressed reference frame on a display monitor.

37. The method of claim 36, wherein said compressed video data is compressed in MPEG format and said reference frames are I-frames.

38. A computer-readable medium having a data structure stored thereon, said data structure comprising:

compressed image data having a plurality of frames including a plurality of reference frames, said compressed image data representing continuous image footage in compressed form; and a plurality of data references each identifying a portion of the image footage to be accessed, where each said data reference is linked to the identified portion of the image footage such that when the data reference is displayed on a display device and a user selects the data reference, the compressed image data may be decompressed starting at a reference frame preceding the first frame of the identified portion of the video footage.

39. The computer-readable medium as defined in claim 38, wherein said image footage is video footage of a pipeline inspection, said data references correspond to suspected defects in the inspected pipeline, and each portion of the video footage identified by a data reference shows a suspected defect.

40. The computer-readable medium as defined in claim 38, wherein said medium is a digital disc.

41. The computer-readable medium as defined in claim 38, wherein said image footage is video footage compressed in MPEG format, and said reference frames are I-frames.

* * * * *

UNITED STATES PATENT AND TRADEMARK OFFICE
CERTIFICATE OF CORRECTION

PATENT NO. : 6,175,380 B1
DATED : January 16, 2001
INVENTOR(S) : Jeffrey A. Van Den Bosch It is certified that error appears in the above-identified patent and that said Letters Patent is hereby corrected as shown below:

Column 5,
Line 38, "Huffinan" should be -- Huffman --;

Column 13,
Line 12, "claim 21" should be -- claim 22 --.

Signed and Sealed this

Eleventh Day of December, 2001

*Attest:*

NICHOLAS P. GODICI
*Attesting Officer*     *Acting Director of the United States Patent and Trademark Office*